United States Patent
Li et al.

(10) Patent No.: US 12,242,483 B2
(45) Date of Patent: Mar. 4, 2025

(54) DATA BASE SYSTEM AND METHOD FOR MAINTAINING A DATA BASE

(71) Applicant: GRABTAXI HOLDINGS PTE. LTD., Singapore (SG)

(72) Inventors: Muqi Li, Issaquah, WA (US); Shiqi Zhong, Bellevue, WA (US); Chao Wang, Kirkland, WA (US); Jun Liu, Bothell, WA (US); Varun Kansal, Sammamish, WA (US)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/023,897

(22) PCT Filed: Sep. 1, 2021

(86) PCT No.: PCT/SG2021/050528
§ 371 (c)(1),
(2) Date: Feb. 28, 2023

(87) PCT Pub. No.: WO2022/050900
PCT Pub. Date: Mar. 10, 2022

(65) Prior Publication Data
US 2023/0315735 A1    Oct. 5, 2023

(30) Foreign Application Priority Data
Sep. 3, 2020   (SG) ............... 10202008564P

(51) Int. Cl.
*G06F 16/24* (2019.01)
*G06F 16/215* (2019.01)
(Continued)

(52) U.S. Cl.
CPC ...... *G06F 16/24552* (2019.01); *G06F 16/215* (2019.01); *G06F 16/258* (2019.01)

(58) Field of Classification Search
CPC ............ G06F 16/24552; G06F 16/215; G06F 16/258; G06F 16/1794
See application file for complete search history.

(56) References Cited

U.S. PATENT DOCUMENTS

| 8,447,754 B2 | 5/2013 | Weissman et al. |
| 9,436,710 B2 | 9/2016 | Shoolman et al. |

(Continued)

FOREIGN PATENT DOCUMENTS

| CN | 101515291 A | 8/2009 |
| CN | 104662539 A | 5/2015 |

(Continued)

OTHER PUBLICATIONS

S, Rajan, "System Design on Kafka and Redis", Database Zone (6 pgs.).

(Continued)

*Primary Examiner* — Kris E Mackes
*Assistant Examiner* — Cecile H Vo
(74) *Attorney, Agent, or Firm* — Buckley, Maschoff & Talwalkar LLC

(57) ABSTRACT

Aspects concern a data base system comprising a data base for storing entity states, a configuration interface configured to receive, for an entity state type, a specification of an entity state data format for writing an entity state of the entity state type to the data base and a data base access interface configured to receive a write request for writing an entity state to the data base, check whether the write request includes entity state data for writing the entity state to the data base in an entity state data format specified for writing entity states of the entity state's entity state type to the data base, and write the entity state data to the data base if the write request includes the entity state data in an entity state (Continued)

data format specified for writing entity states of the entity state's entity state type to the data base.

11 Claims, 4 Drawing Sheets

(51) Int. Cl.
*G06F 16/2455* (2019.01)
*G06F 16/25* (2019.01)

(56) References Cited

U.S. PATENT DOCUMENTS

| | | | | |
|---|---|---|---|---|
| 2002/0184521 | A1* | 12/2002 | Lucovsky | G06F 21/6218 726/6 |
| 2011/0153667 | A1* | 6/2011 | Parmenter | G06F 16/2365 707/E17.014 |
| 2017/0316072 | A1* | 11/2017 | Persson | G06F 16/2379 |
| 2019/0227937 | A1* | 7/2019 | Ramamurthy | G06F 16/24552 |

FOREIGN PATENT DOCUMENTS

| | | |
|---|---|---|
| CN | 107329849 | 9/2017 |
| CN | 107133447 | 11/2017 |

OTHER PUBLICATIONS

"Database Caching Strategies Using Redis", Amazon Web Services, Inc., May 2017 (18 pgs).

"Redis cache for PostgreSQL in Entity Framework 6", Entity Framework, Jun. 30, 2020 (13 pgs).

N. Narkhede, "Event Sourcing, CQRS, Stream Processing and Apache Kafka: What's the Connection?" Confluent, Sep. 7, 2016 (14 pgs).

Chinese First Office Action dated Oct. 11, 2023 which was issued in connection with a counterpart applicaiton Chinese Application No. 2021800542408. Machine English Translation Provided.

* cited by examiner

DATA BASE SYSTEM AND METHOD FOR MAINTAINING A DATA BASE

TECHNICAL FIELD

Various aspects of this disclosure relate to data base systems and methods for maintaining a data base.

BACKGROUND

Whether customers are satisfied with an e-hailing service which enables customers to hail taxis using their smartphones largely depends on the quality of the e-hailing service's drivers, i.e. whether they take sensible routes, do not try to cheat the customers and are friendly. To have control over the quality of the drivers, an e-hailing server may maintain a data base storing information a driver, such as whether the driver is whitelisted or blacklisted for the e-hailing service. Similarly, it may be desirable to whitelist or blacklist passengers, e.g. if they do not pay or misbehave. In general, data bases may be maintained storing entity (e.g. driver or passenger) states. Efficient approaches for maintaining such data bases, in particular when they are being accessed by a multiplicity of devices and services, are desirable.

SUMMARY

Various embodiments concern a data base system comprising a data base for storing entity states, a configuration interface configured to receive, for an entity state type, a specification of an entity state data format for writing an entity state of the entity state type to the data base and a data base access interface configured to receive a write request for writing an entity state to the data base, check whether the write request includes entity state data for writing the entity state to the data base in an entity state data format specified for writing entity states of the entity state's entity state type to the data base, reject the write request if the write request does not include the entity state data in an entity state data format specified for writing entity states of the entity state's entity state type to the data base and write the entity state data to the data base if the write request includes the entity state data in an entity state data format specified for writing entity states of the entity state's entity state type to the data base.

According to one embodiment, the data base system further comprises a data base cache, wherein the data base access interface is configured to receive a read request for reading an entity state from the data base system, look up the entity state in the cache layer; and respond to the read request by providing the entity state if the entity state is included in the data base cache.

According to one embodiment, the data base access interface is configured to reject the read request if the entity state is not stored in the data base cache.

According to one embodiment, the data base access interface is configured to write the entity state to both the data base and the data base cache if the write request includes the entity state data in an entity state data format specified for writing entity states of the entity state's entity state type to the data base.

According to one embodiment, the data base cache is non-relational.

According to one embodiment, the data base is relational or is non-relational.

According to one embodiment, the data base access interface supports multi-tenancy to handle write requests and read requests from multiple services and devices.

According to one embodiment, the data base access interface comprises a streaming interface and is configured to assign write requests it receives to a write stream and is configured to export the write requests in the write stream for writing entity type data contained in the write requests to the data base and to the data base cache.

According to one embodiment, the data base access interface is configured to check for each write request in the write stream whether the write request includes entity state data for writing the entity state to the data base in an entity state data format specified for writing entity states of the entity state's entity state type to the data base and export the write requests to the data base if the write request includes the entity state data in an entity state data format specified for writing entity states of the entity state's entity state type to the data base.

According to one embodiment, the data base access interface is configured to receive the specification of the entity state data format in a configuration write request.

According to one embodiment, the data base system is configured to receive a configuration read request for a specification of an entity state data format for writing an entity state of the entity state type to the data base and to provide the specification of the entity state data format in response to the configuration read request.

According to one embodiment, a method for maintaining a data base is provided comprising receiving, for an entity state type, a specification of an entity state data format for writing an entity state of the entity state type to a data base, receiving a write request for writing an entity state to the data base, checking whether the write request includes entity state data for writing the entity state to the data base in an entity state data format specified for writing entity states of the entity state's entity state type to the data base, rejecting the write request if the write request does not include the entity state data in an entity state data format specified for writing entity states of the entity state's entity state type to the data base and writing the entity state data to the data base if the write request includes the entity state data in an entity state data format specified for writing entity states of the entity state's entity state type to the data base.

According to one embodiment, a computer program element is provided comprising program instructions, which, when executed by one or more processors, cause the one or more processors to perform the method for maintaining a data base described above.

According to one embodiment, a computer-readable medium is provided comprising program instructions, which, when executed by one or more processors, cause the one or more processors to perform the method for maintaining a data base described above.

It should be noted that embodiments described in context of the data base system are analogously valid for the method for maintaining a data base.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

An e-hailing app, typically used on a smartphone, allows its user to hail a taxi (or also a private driver) through his or her smartphone for a trip.

Figure 1:
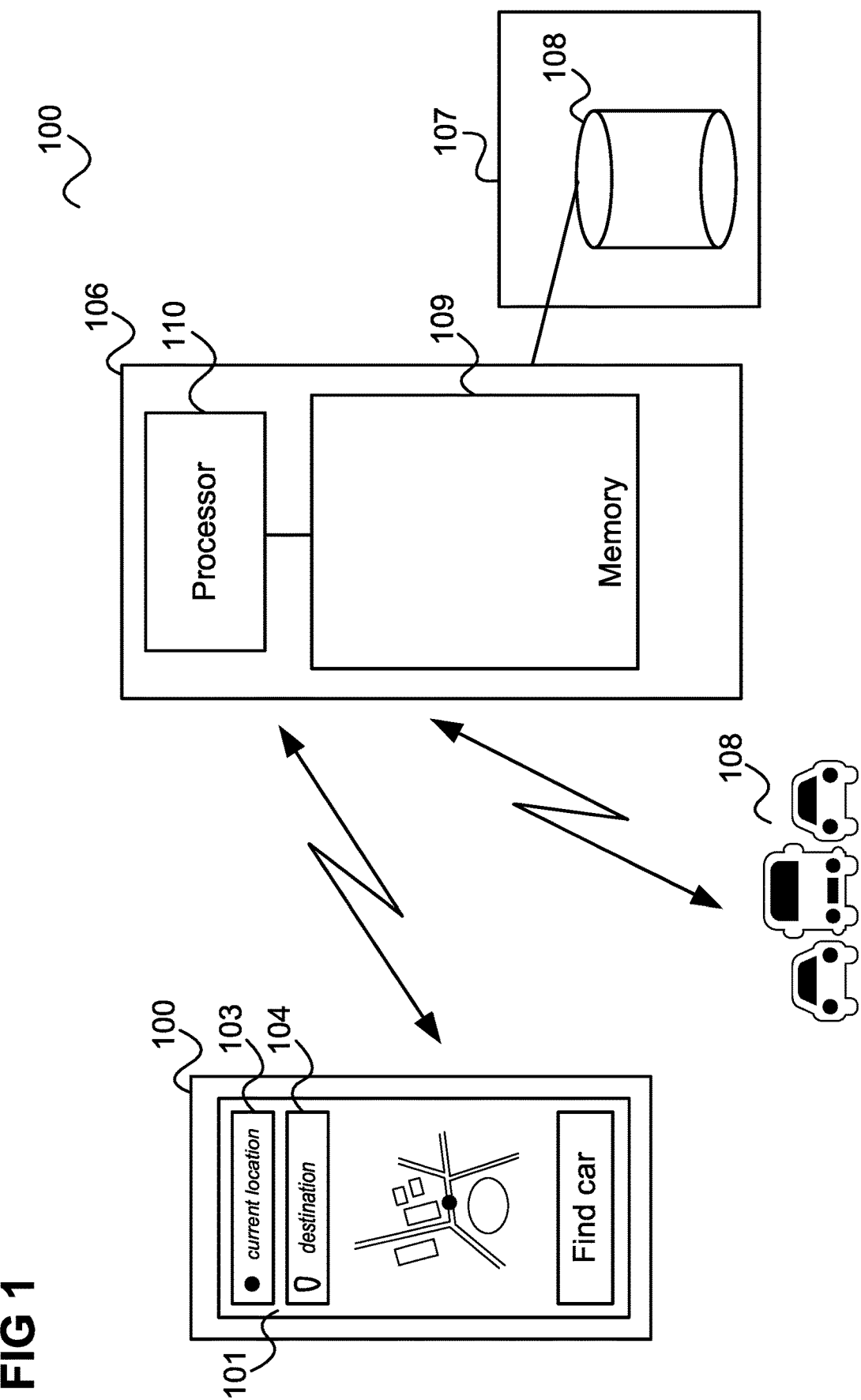
FIG. 1 shows a communication arrangement for usage of an e-hailing service including a smartphone and a server.

FIG. 1 shows a communication arrangement including a smartphone 100 and a server (computer) 106.

The smartphone 100 has a screen showing the graphical user interface (GUI) of an e-hailing app that the smartphone's user has previously installed on his smartphone and has opened (i.e. started) to e-hail a ride (taxi or private driver).

The GUI 101 includes a map 102 of the vicinity of the user's position (which the app may determine based on a location service, e.g. a GPS-based location service). Further, the GUI 101 includes a box for point of departure 103 (which may be set to the user's present location obtained from location service) and a box for destination 104 which the user may touch to enter a destination (e.g. opening a list of possible destinations). There may also be a menu (not shown) allowing the user to select various options, e.g. how to pay (cash, credit card, credit balance of the e-hailing service). When the user has selected a destination and made any necessary option selections, he or she may touch a "find car" button 105 to initiate searching of a suitable car.

For this, the e-hailing app communicates with the server 106 of the e-hailing service via a radio connection. The server 106 may include a data base having information about the current location of registered vehicles 108, about when they are expected to be free, about traffic jams etc. From this, a processor 110 of the server 106 selects the most suitable vehicle (if available, i.e. if the request can be fulfilled) and provides an estimate of the time when the driver will be there to pick up the user, a price of the ride and how long it will take to get to the destination. The server communicates this back to the smartphone 100 and the smartphone 100 displays this information on the GUI 101. The user may then accept (i.e. book) by touching a corresponding button. If the user accepts, the server 106 informs the selected vehicle 108 (or, equivalently, its driver), i.e. the vehicle the server 106 has allocated for fulfilling the transport request.

It should be noted while the server 106 is described as a single server, its functionality, e.g. for providing an e-hailing service for a whole city, will in practical application typically be provided by an arrangement of multiple server computers (e.g. implementing a cloud service). Accordingly, the functionality described in the following provided by the server 106 may be understood to be provided by an arrangement of servers or server computers.

For the operator of an e-hailing service, it is of high importance that the quality of the drivers of the vehicles 108 which may be allocated to trips is high because customers will be unhappy and may stop using the e-hailing service if their driver is unfriendly, takes poor routes (e.g. taking too long) or even tries to cheat them. To be able to ensure the driver's quality, the server 106 may maintain a data base 108 storing information about drivers, such as whether the driver is whitelisted or blacklisted for the e-hailing service.

Similarly, it may be desirable to whitelist or blacklist a passenger, e.g. blacklist a passenger who misbehaves. The server 106 may reject booking requests from a blacklisted passenger (e.g. identifies by his or her e-hailing service account or mobile number).

The data base 108 is, according to various embodiments, part of a data base system 107 which may be external to the server 106 but may also be implemented locally in a memory 109 of the server 106.

In general, a data base may be maintained storing entity states. In the above example of an e-hailing service, the entity would be a driver and the state would be whether the driver is whitelisted.

Entity states are stored in the data base in form of entity state data. In the general case, the entity state data is a list of entity-state pairs. Each entity-state pair defines and entity and its state by specifying one of multiple values of the state. This means that an entity state is stored by storing an entity state value. The entity, the entity state and the possible entity state values depend on the application scenario. For example, in an e-hailing service, the entity may be a driver, the entity state may be a Ban Status and the value may be "true" (if the driver is banned, i.e. blacklisted) or "false" (if the driver is not banned).

At large scale companies, different types of entity state data like this are typically maintained and updated at a very large scale across different services. As the entity state data scale continuously, issues arise like:

When referring to storage and lookup of an entity state, engineers should have a common "where" and "how" methodology to handle that;

Multiple programs be written and used for accessing the data base. It is important to keep track of the different entity states that have been defined and used;

Managing the scale and storage becomes hard due to the freestyle of adding additional entity states;

Resource costs may increase because of overly use of high-cost infrastructure without consideration;

The performance is under risk if there is no control of traffic accessing the shared storage tier (i.e. a shared data base).

It may be desirable to have the useful entity states as unified structured data, which can be valuable on offline analytics.

In view of the above issues, according to various embodiments, an Entity State Management & Tracking System in form of a data base system is provided. The data base system provided according to various embodiments overcomes the above issues and thus provides an improvement over conventional data base systems. In particular, data duplication, confusion of data access, high system costs, etc. can be avoided by the provided data base system which allows storing the entity state data for a high number of entities in one place with a unified structure.

Figure 2:
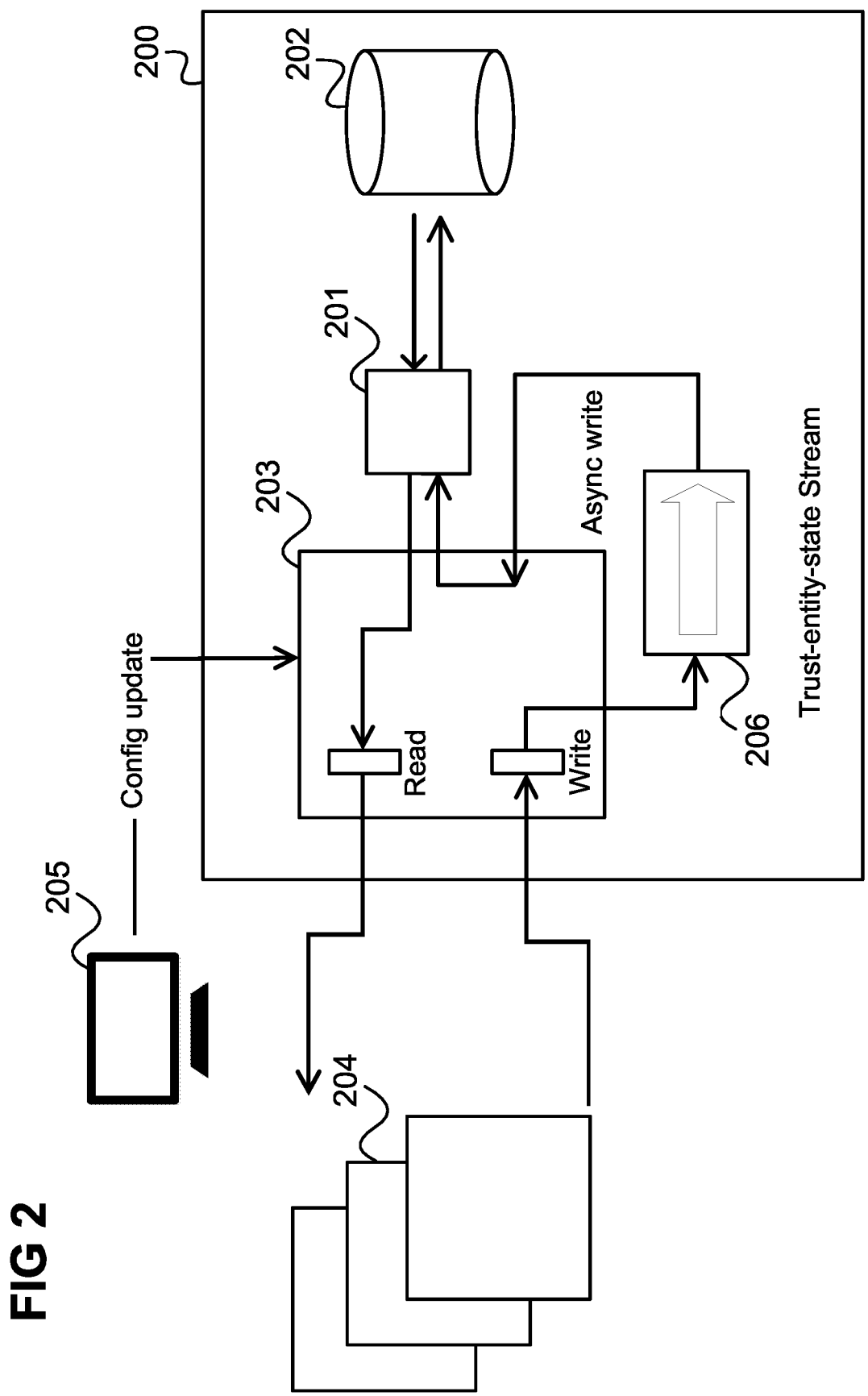
FIG. 2 shows the architecture of a data base system according to an embodiment.

FIG. 2 shows a data base system 200 according to an embodiment.

The data base system 200 comprises a cache 201 (implementing a cache layer of the data base system), e.g. implemented using Redis, to serve Entity States lookups. Redis is an in-memory data structure project implementing a distributed, in-memory key-value data base with optional durability.

Further, the data base system 200 comprises a data base 202 (implementing a data persistence layer), e.g. implemented using Mysql or DynamoDB, to serve Entity States writes. DynamoDB is a fully managed proprietary NoSQL data base service that supports key-value and document data structures.

A data base access interface 203 (or data base access layer) provides access (i.e. provides a data base access service) for data base clients 204. The data base clients 204 may correspond to various devices, in particular servers providing services themselves. In context of an e-hailing service, a requesting entity may for example be a server 106 providing a service for ensuring safety, a service for preventing fraud, a service for ensuring customer trust in the e-hailing service etc.

To avoid the 'freestyle' of data management, the data base access interface 203 performs a strong format check for each entity state update by inducing EntityStateType configurations. For example, the data base access interface 203 may ensure that every write access to the data base 202 of an entity state is in line with a format configured for the entity state, i.e. that the entity state data to be stored is in line with the configured format. Configurations of entity state data formats and updates thereof are provided to the data base system 200 by a data format configuration server 205, e.g. via a configuration interface of the data base system 200. A data base client 204 may send a request for an entity state data format to the data base system 200. The data base system 200 may have a memory storing the entity state data formats and provide them in response to entity state data format requests. This allows a data base client 204 to be informed about the format it needs to use for storing or updating an entity state in the data base 202.

As a centralized platform to share unified data across different services (provided by data base clients 204) and at the same time to avoid over exposure, the data base system 200 (in particular the data base access interface 203) supports multi-tenancy support.

For allowing read accesses for entity states, write accesses for entity states, read requests for entity state data formats and write requests for entity state data formats (by the configuration server 205), the data base access interface provides a BatchReadEntityStates API (application programming interface), a BatchWriteEntityStates API, a ReadConfigs API and a WriteConfig API, respectively.

According to one embodiment, the data base system comprises a streaming interface 206 (implementing a streaming layer), for example implemented using Kafka, to streamline the traffic accessing the data base system 200 (i.e. entity state read requests and entity state write requests). This allows in particular a cost-efficient implementation of the data base system. Kafka is an open-source stream-processing software platform which aims to provide a unified, high-throughput, low-latency platform for handling real-time data feeds.

In the following, examples for entity state read requests, entity state write requests, as well as requests for reading the configuration of the data format of an entity state and writing the configuration of the data format of an entity state (for defining and updating a configuration) are given.

Table 1 shows an example of an entity state read request, i.e. a request for reading an entity state stored in the data base system. The entity state read request is sent by one of the data base clients 204. The entity is in this example a passenger and the entity state is whether the passenger is whitelisted (which may be true or false). The request specifies a tenant which may be an identification of the requesting entity.

TABLE 1

Request Sample:
{
  "keys": [{
    "entityType": "Passenger",
    "entityID": "8753524",
    "stateType": "Whitelist"
  },
  "TenantName": tenant_a
}

When receiving an entity state read request, the data base access interface 203 to respond to it by read only from the cache 201. If there is a cache miss (i.e. the requested entity state value is not stored in the cache), the data base access interface 203 assumes that the requested entity state value is not contained in the data base 202 either. In some examples, the data base 202 and the cache 201 are dimensioned such that each has a virtual unlimited capacity, for example, the storage capacity of each is higher than estimated peak storage needs. In some examples, the data base access interface may be configured to write the entity state to both the data base and the data base cache if the write request includes the entity state data in an entity state data format specified for writing entity states of the entity state's entity state type to the data base. So there would not be a case where valid data only exists in the data base 202 but not in the cache 201.

According to various embodiments, an entity state may be deleted when then value of "expiredAt" exceeds the current time.

Table 2 shows an example of a response to an entity state read request. The response is sent by the data base interface 203 to the data base client 204 having sent the entity state read request.

TABLE 2

Response Sample:
{
  "values": [
    {
      "stateValue": "true",
      "expiredAt": "2020-04-23T19:35:34+00:00"
      "eventID" : "65348ewtfd345dsa",
      "memo": "some memo",
      "operator" : "tester",
      "createdAt" : "2019-04-23T19:35:34+00:00",
      "updatedAt" : "2019-04-23T19:35:34+00:00"
    }
  ]
}

Table 3 shows an example of an entity state write request, i.e. a request for writing an entity state to the database system or updating an entity state stored in the database system. The entity state write request is sent by one of the data base clients 204. The entity is in this example a passenger, the entity state is whether the passenger is whitelisted and the entity state value is "true".

TABLE 3

Request Sample:
{
  "entityStates": [
    {
      "entityType": "Passenger",
      "entityID": "8753524",
      "stateType": "Whitelist",
      "stateValue": "true",
      "expiredAt": "2020-04-23T19:35:34+00:00",
      "eventID": "65348ewtfd345dsa",
      "memo": "some memo",
      "operator": "tester",
      "createdAt": "2019-04-23T19:35:34+00:00",
      "updatedAt": "2019-04-23T19:35:34+00:00"
    }
  ]
}

The data base access layer 203 puts, for each entity state write request that it receives in form of a State Update Event into the streaming interface 206, which may be dedicated to writing, for example, indicated in FIG. 2 as "Trust-entity-state Stream". For each write request in the write stream, the data base access layer 203 checks whether it contains entity type data which is in line with the configured entity type data format and writes the entity type data to the cache 201 and to the data base 202 if the entity type data which is in line with the configured entity type data format. The data base access layer 203 may write the entity type data to the cache 201 and to the data base 202 in an asynchronous pattern (i.e. asynchronously).

Table 4 shows an example of an entity state data format read request, i.e. a request for reading an entity state data format that is to be used for writing an entity state to the data base system 200. The entity state data format read request is sent by one of the data base clients 204 or by the configuration server 205. As previously explained, the data base access interface may be configured to write the entity state to both the data base and the data base cache if the write request includes the entity state data in an entity state data format specified for writing entity states of the entity state's entity state type to the data base.

TABLE 4

Request Sample:
{ "entityTypes":["Passenger"] }

Table 5 shows an example of a response to an entity state data format read request, The response to the entity state data format read request is sent by the data base access interface 203 to the respective requesting entity, which may be a database client 204 or the configuration server 205.

TABLE 5

Response Sample:
{
  "entityStateTypes": [
    {
      "entityType": "Passenger",
      "stateType": "Whitelist",
      "isActive": "true",
      "description" :"some description",
      "createdAt": "2019-06-04T19:35:34+00:00",
      "deletedAt" : ""
    },
  ]
}

Table 6 shows an example of an entity state data format write request, i.e. a request for writing (i.e. configuring) an entity state data format that is to be used for writing an entity state to the data base system 200. The entity state data format write request is sent by the configuration server 205.

TABLE 6

Request Sample:
{
  "entityStateTypes": [
    {
      "entityType": "Passenger",
      "stateType": "Whitelist",
      "isActive": "true",
      "description" :"some description",
      "createdAt": "2019-06-04T19:35:34+00:00",
      "deletedAt" : ""
    },
  ]
}

Figure 3:
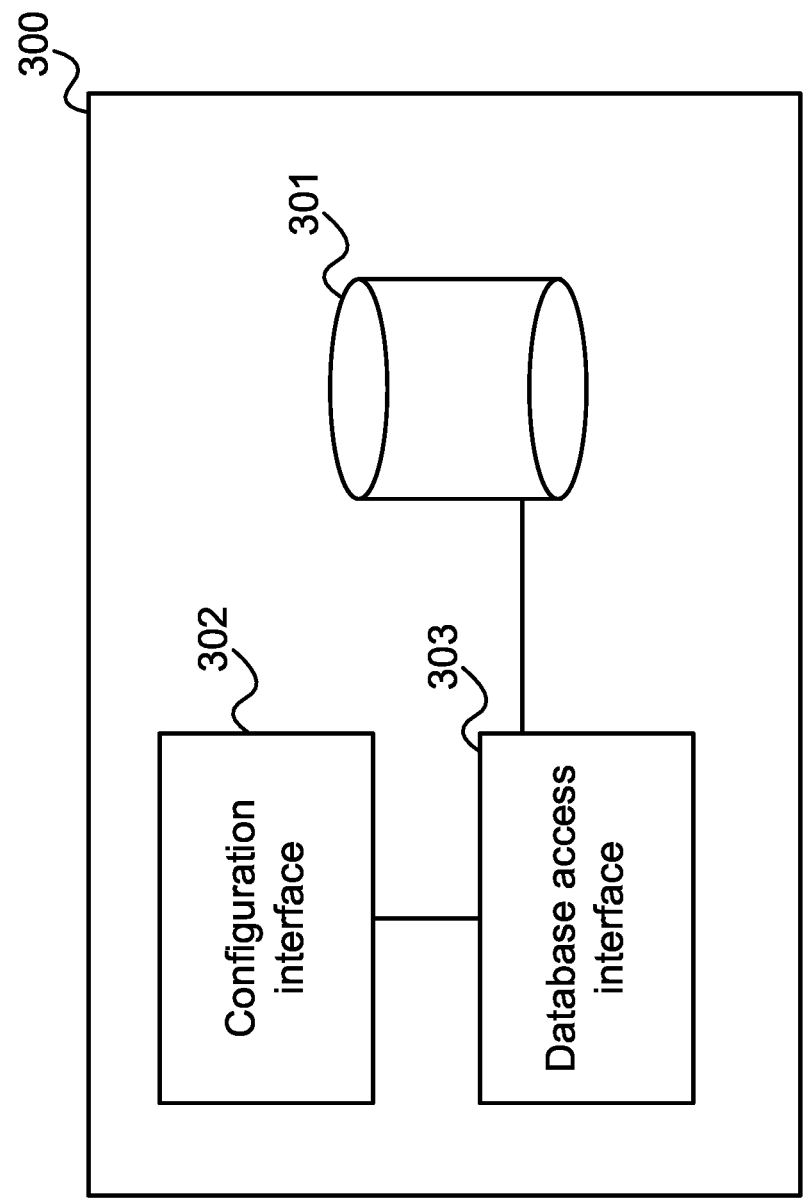
FIG. 3 shows a data base system according to an embodiment.

In summary, according to various embodiments, a data base system is provided as illustrated in FIG. 3.

FIG. 3 shows a data base system 300.

The data base system 300 comprises a data base 301 for storing entity states and a configuration interface 302 configured to receive, for an entity state type, a specification of an entity state data format for writing an entity state of the entity state type to the data base.

The data base system 300 further comprises a data base access interface 303 configured to receive a write request for writing an entity state to the data base, check whether the write request includes entity state data for writing the entity state to the data base in an entity state data format specified for writing entity states of the entity state's entity state type to the data base, reject the write request if the write request does not include the entity state data in an entity state data format specified for writing entity states of the entity state's entity state type to the data base and write the entity state data to the data base if the write request includes the entity state data in an entity state data format specified for writing entity states of the entity state's entity state type to the data base.

According to various embodiments, in other words, a data base access layer ensures that the data regarding entity states to be stored in a data base follows a predefined format.

The approach of FIG. 3 (in its exemplary implementations as described above) allows achieving fast handling of many accesses for a multiplicity of accessing services. For example, in one implementation, the data base system achieves read at 1 Million QPS (queries per second), writes at 10K QPS with latency of read P99 at 50 ms and writes P99 at 500 ms.

Figure 4:
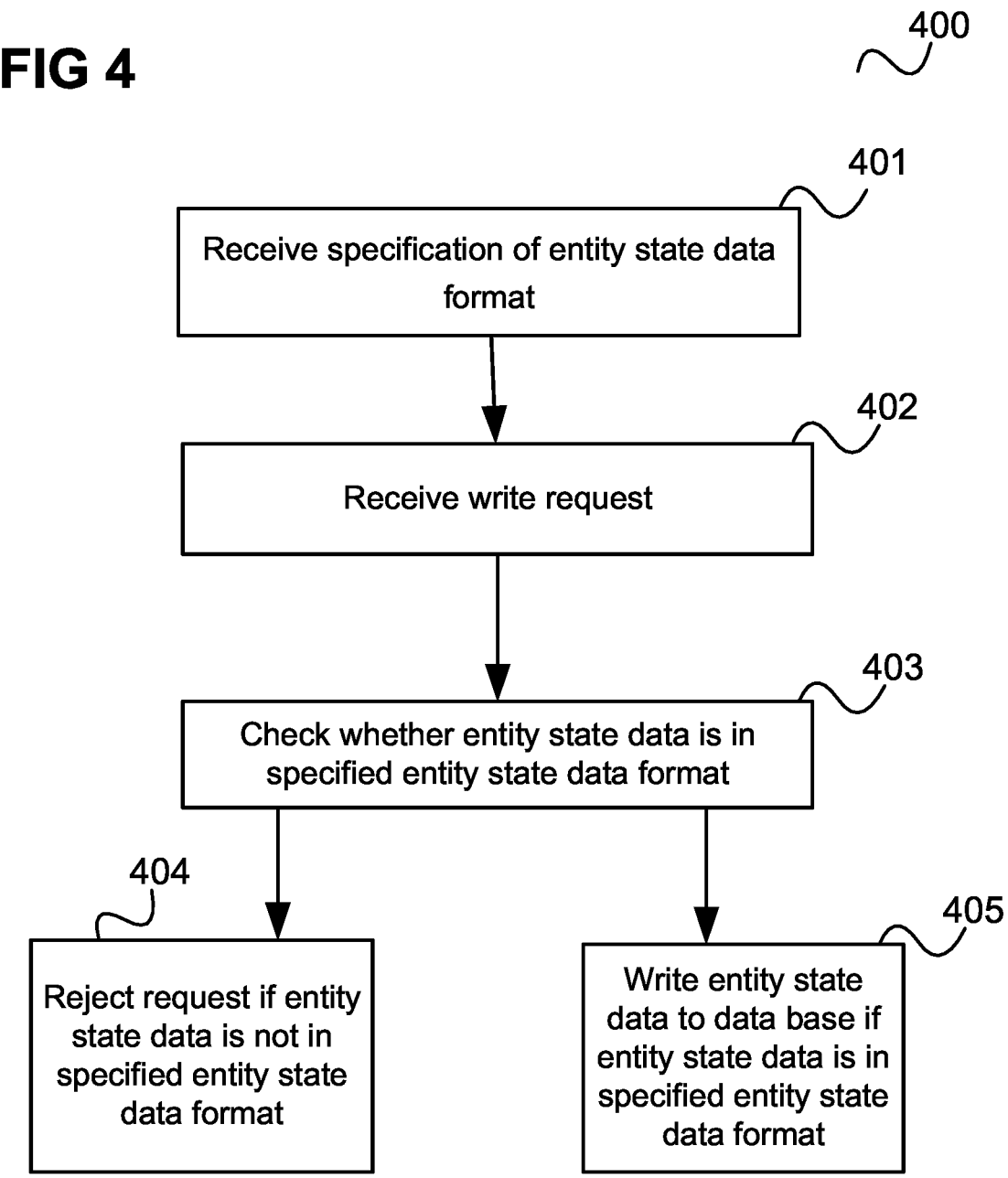
FIG. 4 shows a flow diagram illustrating a method for maintaining a data base according to an embodiment.

According to one embodiment, a method is provided as illustrated in FIG. 4.

FIG. 4 shows a flow diagram illustrating a method for maintaining a data base.

In 401, for an entity state type, a specification of an entity state data format for writing an entity state of the entity state type to a data base is received.

In 402, a write request for writing an entity state to the data base is received.

In 403 it is checked whether the write request includes entity state data for writing the entity state to the data base in an entity state data format specified for writing entity states of the entity state's entity state type to the data base.

In 404 the write request is rejected if the write request does not include the entity state data in an entity state data format specified for writing entity states of the entity state's entity state type to the data base.

In 405, the entity state data is written to the data base if the write request includes the entity state data in an entity state data format specified for writing entity states of the entity state's entity state type to the data base.

The methods described herein may be performed and the various processing or computation units and devices described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A data base system comprising:
one or more processors;
a data base storing entity state data;
a data base cache;
a configuration interface receiving, for an entity state type, a specification of an entity state data format for writing an entity state of the entity state type to the data base, the specification of an entity state data format provided by a data format configuration server; and
a data base access interface
receiving, from a data base client device, a write request for writing an entity state to the data base, the write request including at least data identifying a received entity state type;
obtaining the specification of an entity state data format associated with the received entity state type from the configuration interface;
comparing the write request with the specification of an entity state data format associated with the received entitystate type to determine whether the write request complies with the entity state data format associated with the received entity state type;
rejecting the write request if the write request does not comply with the entity state data format associated with the received entity state type; and
writing the entity state data to both the data base and the data base cache if the write request complies with the entity state data format associated with the received entity state type base;
wherein the data base access interface comprises a streaming interface and is configured to assign write requests it receives to a write stream and is configured to export the write requests in the write stream for writing entity type data contained in the write requests to the data base and to the data base cache.

2. The data base system of claim 1, wherein the data base access interface is configured to
receive a read request for reading an entitystate from the data base system; look up the entity state in a cache layer; and
respond to the read request by providing the entitystate if the entity state is included in the data base cache.

3. The data base system of claim 2, wherein the data base access interface is configured to reject the read request if the entity state is not stored in the data base cache.

4. The data base system of claim 1, wherein the data base cache is non-relational.

5. The data base system claim 1, wherein the data base is relational or is non-relational.

6. The data base system of claim 1, wherein the data base access interface supports multi-tenancy to handle write requests and read requests from multiple services and devices.

7. The data base system of claim 1, wherein the data base access interface is configured to
check for each write request in the write stream whether the write request includes entity state data for writing an entity state to the data base in an entity state data format specified for writing entity states of the entity state's entitystate type to the data base; and
export the write requests to the data base if the write request includes the entity state data in the entity state data format specified for writing entity states of the entity state's entity state type to the data base.

8. The data base system of claim 1, wherein the data base access interface is configured to receive the specification of the entity state data format in a configuration write request.

9. The data base system of claim 1, wherein the data base system is configured to receive a configuration read request for a specification of an entity state data format for writing an entity state of the entity state type to the data base and to provide the specification of the entity state data format in response to the configuration read request.

10. A method for maintaining a data base comprising:
operating a configuration interface to receive, for an entity state type, a specification of an entity state data format for writing an entity state of the entity state type to the data base, the specification of an entity state data format provided by a data format configuration server;

receiving, from a data base client device, a write request for writing an entity state to the data base, the write request including at least data identifying a received entity state type;

obtaining the specification of an entity state data format associated with the received entity state type from the configuration interface;

comparing the write request with the specification of an entity state data format associated with the received entitystate type to determine whether the write request complies with the entity state data format associated with the received entity state type;

rejecting the write request if the write request does not comply with the entity state data format associated with the received entity state type; and writing the entity state data to both the data base and a data base cache if the write request complies with the entity state data format associated with the received entity state type;

wherein the write request is received by a data base access interface which comprises a streaming interface and is configured to assign write requests it receives to a write stream and is configured to export the write requests in the write stream for writing entity type data contained in the write requests to the data base and to the data base cache.

11. A computer-readable medium comprising program instructions, which, when executed by one or more processors, cause the one or more processors to perform processing to:

operate a configuration interface to receive, for an entity state type, a specification of an entity state data format for writing an entity state of the entity state type to the data base, the specification of an entity state data format provided by a data format configuration server;

receive, from a data base client device, a write request for writing an entity state to the data base, the write request including at least data identifying a received entity state type;

obtain the specification of an entity state data format associated with the received entity s tate type from the configuration interface;

compare the write request with the specification of an entity state data format associated with the received entity state type to determine whether the write request complies with the entity state data format associated with the received entity state type;

rejecting the write request if the write request does not comply with the entity state data format associated with the received entity state type; and writing the entity state data to both the data base and a data base cache if the write request complies with the entity state data format associated with the received entity state type;

wherein the write request is received by a data base access interface which comprises a streaming interface and is configured to assign write requests it receives to a write stream and is configured to export the write requests in the write stream for writing entity type data contained in the write requests to the data base and to the data base cache.

\* \* \* \* \*